United States Patent [19]
Nanba et al.

[11] Patent Number: 5,970,288
[45] Date of Patent: Oct. 19, 1999

[54] IMAGE READING DEVICE

[75] Inventors: Katsuhiro Nanba, Okazaki; Masamitsu Ishiyama, Toyokawa, both of Japan

[73] Assignee: Minolta Co., Ltd., Osaka, Japan

[21] Appl. No.: 08/870,719

[22] Filed: Jun. 6, 1997

[30] Foreign Application Priority Data

Jun. 7, 1996 [JP] Japan .................................. 8-145605

[51] Int. Cl.⁶ .......................... G03G 15/04; G03G 15/28
[52] U.S. Cl. .......................... 399/211; 399/208; 399/212
[58] Field of Search .................................. 399/211, 212, 399/213, 208; 347/257, 224, 129, 134; 346/107.1

[56] References Cited

U.S. PATENT DOCUMENTS

| | | | |
|---|---|---|---|
| 3,832,057 | 8/1974 | Shogren | 399/212 |
| 4,073,584 | 2/1978 | Kitajima . | |
| 4,355,883 | 10/1982 | Landa . | |
| 4,377,337 | 3/1983 | Beck | 399/211 |
| 4,500,197 | 2/1985 | Dannatt | 399/211 |
| 4,629,310 | 12/1986 | Landa et al. | 399/200 |
| 4,857,956 | 8/1989 | Honda | 399/210 |
| 4,989,041 | 1/1991 | Miura et al. | 399/212 |

FOREIGN PATENT DOCUMENTS

| | | |
|---|---|---|
| 01-100527 | 4/1989 | Japan . |
| 5-303147 | 11/1993 | Japan . |

*Primary Examiner*—Matthew S. Smith
*Attorney, Agent, or Firm*—McDermott, Will & Emery

[57] ABSTRACT

The image reading device providing a scanning unit provided with a slider pulled by a wire driven by a motor, the image reading device being provided with bilateral direct movement guides which bilaterally support the bilateral ends of the slider so as to be reciprocally movable, and a drive wire fixedly attached to the slider to pull the slider, and wherein the anchoring position of the wire on the slider is the center of gravity position of the slider or is on a straight line coincident to the moment of lateral force of a lateral friction generated between the slider and lateral movement guides during driving.

5 Claims, 5 Drawing Sheets

IMAGE READING DEVICE

BACKGROUND OF THE INVENTION

1. Field of the Invention

The present invention relates to an image reading device that scans images by moving a slider for use in copiers and image readers.

2. Description of the Related Art

In general, there are two drive methods for devices which scan images by moving a scanning unit. Japanese Laid-Open Patent Application No. 5-303147 discloses a unilateral drive system providing a main guide 41 disposed on one side of a main housing to support a slider 40 so as to be movable in the scanning direction, and having a drive wire 43 fixedly attached to a slider end 42 positioned on the exterior side of said slider 40 so as to drive said slider 40 by means of said drive wire 43, as shown in FIGS. 4(*a*) and 4(*b*). U.S. Pat. No. 4,355,883 discloses a bilateral drive system providing drive wires 31 and 32 respectively attached to the bilateral ends of a slider 30 so as to drive said slider 30 by means of said drive wires 31 and 32, as shown in FIG. 5.

The unilateral drive system uses only a single drive wire 43, and generates yawing due to the deflection of the drive force. In the unilateral drive system of FIGS. 4(*a*) and (*b*), a slide member 44 provided on slider 40 is presses against main guide 41 by a spring 45 to prevent the aforesaid yawing. This elastic pressing force, however, cannot adequately suppress the yawing generated by slider 40.

In the bilateral drive system, two drive wires 31 and 32 are provided in identical bilateral mechanical constructions so as to transmit the rotational force of the drive motor 33 as equal direct drive forces to both sides of slider 30. As shown in FIG. 5, however, a transmission mechanism 37 is provided on either right or left side at the action point for transmission of the drive force from drive motor 33 to the slider 30, such that the transmission of the drive force to the transmission mechanism 35 on the opposite side is accomplished via a drive shaft 34 connecting both transmission mechanisms. When restriction of the space for installation prevents using a thick drive shaft 34, elastic twisting is generated in the drive shaft 34, such that a temporal dislocation occurs between the two transmission mechanisms when driving, which readily produces yawing of slider 30. Furthermore, although drive shaft 34 is mainly driven in its lengthwise direction in FIG. 5, temporal dislocation of the drive of both transmission mechanisms when driving is produced by precision discrepancies between said bilateral mechanisms as well as low rigidity of the pulleys 35 through 38, thereby causing yawing of slider 30.

OBJECTS AND SUMMARY

An object of the present invention is to suppress the occurrence of yawing caused imbalance of said unilateral drive system and imbalance between the bilateral drive forces due to precision discrepancies between said bilateral mechanisms as well as low rigidity of the drive force transmission units of the bilateral drive units via the drive shaft and pulley mechanisms in the bilateral drive system.

The image reading device of the present invention achieves the aforesaid objects by providing an image reading device that scan images via a scanning unit provided with a slider pulled by a wire driven by a motor, said image reading device being provided with bilateral direct movement guides which bilaterally support the bilateral ends of said slider so as to be reciprocally movable, and a drive wire fixedly attached to said slider to pull said slider, and wherein the anchoring position of said wire on said slider is the center of gravity position of said slider or is on a straight line coincident to the moment of lateral force of a lateral friction generated between said slider and lateral movement guides during driving.

These and other objects, advantages and features of the invention will become apparent form the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

The preferred embodiments of the present invention are described hereinafter with reference to the accompanying drawings.

Figure 1:
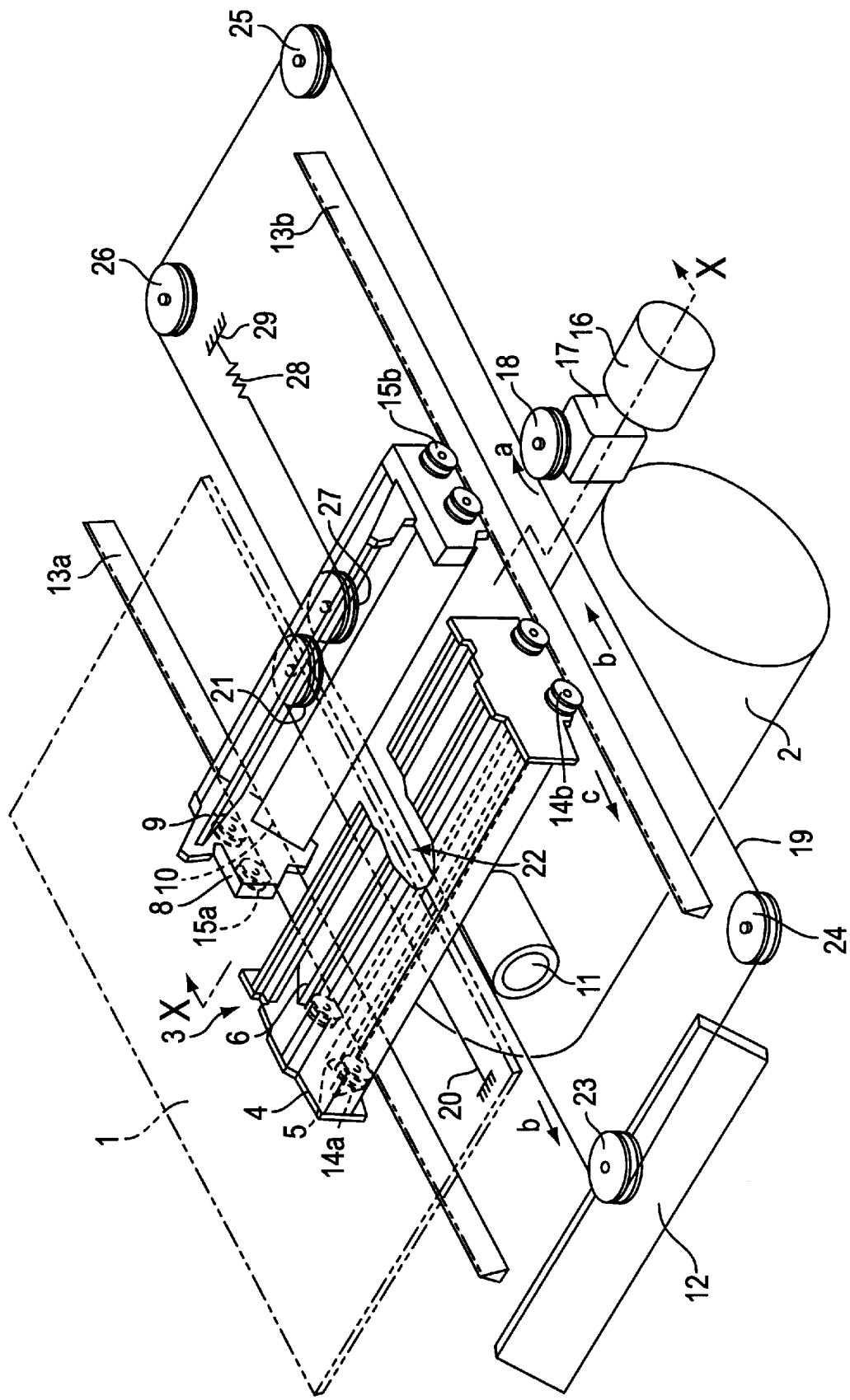
FIG. 1 is a partial section in perspective view showing an example of a copier using the image reading device of the present invention.
Figure 2:
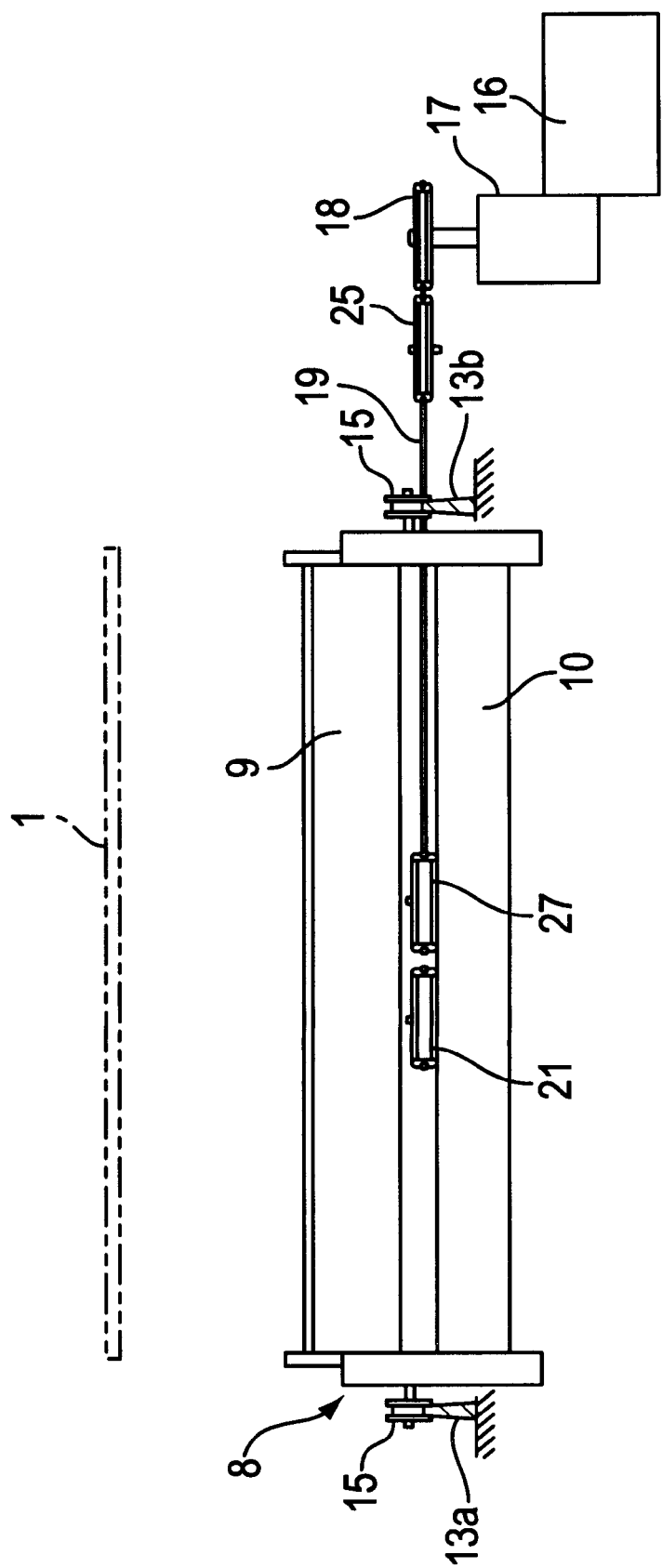
FIG. 2 is an X—X section view of FIG. 1.

The image forming unit of a copier which is a first embodiment of the present invention comprises a glass document platen 1, photosensitive drum 2 disposed beneath said platen 1, and a scanning unit 3 disposed medially to said document platen 1 and said photosensitive drum 2, as shown in FIG. 1.

The driven unit of said scanning unit 3 comprises a first slider 4 to scan images, and a second slider 8 to move between said first slider 4 and the photosensitive drum 2 while maintaining a constant optical path length.

The first slider 4 is provided with an illumination lamp 5, first mirror 6, two sets of two wheels 14*a* and 14*b* disposed at bilateral ends thereof, and an anchor 22 of wire 19 in the vicinity of the center of gravity of said first slider 4. The second slider 8 is provided with second and third mirrors 9 and 10, two sets of two wheels 15*a* and 15*b* disposed at bilateral ends thereof, and pulleys 21 and 27 to wind wire 19 in the vicinity of the center of gravity of said second slider 8.

The drive unit of said scanning unit 3 comprises bilateral drive guides 13*a* and 13*b* supporting said wheels 14*a*, 14*b*, 15*a*, 15*b* disposed at bilateral ends of said first slider 4 and said second slider 8, wire 19 pulled near the center of gravity of said first slider 4 and said second slider 8, motor 16 to reciprocatingly drive wire 19 via a gear box 17, and pulleys 18, 21, and 23 through 27 of the scanning unit to wind the wire 19. The friction coefficients between the drive guides 13*a* and 13*b* and the wheels 14*a* and 14*b* disposed on bilateral sides of the first slider 4 are equal, and the friction coefficients between the drive guides 13*a* and 13*b* and the wheels 15*a* and 15*b* disposed on bilateral sides of said second slider 8 are equal.

One end of the wire 19 is fixedly attached to a housing anchor 20, and the wire 19 returns parallel to the scanning direction to wind around the pulley 21 provided in the vicinity of the center of gravity of the second slider 8, a midpoint of the wire 19 extends parallel to the scanning direction and is anchored to the anchor 22 in the vicinity of the center of gravity of said first slider 4, returns so as to wind around the pulleys 23 and 24 provided on the housing, extends a suitable number of windings around the drive pulley 18 driven by the motor 16 via the gear box 17, returns to wind around the pulleys 25 and 26 provided on the housing, returns parallel to the scanning directions to wind around the pulley 27 provided in the vicinity of the center of gravity of said second slider 8, and ultimately the other end of said wire 19 is fixedly attached to a housing anchor 29 via a tension spring 28 so as to prevent looseness.

Wire 19 intersects the optical path between second and third mirrors 9 and 10 in the vicinity of the pulley 21 of the second slider 8. Since the focal point of the optical system is not located in this vicinity, however, the aforesaid intersection of the optical path by the wire 19 at this location has minimal affect on the optical system and may be safely ignored. Furthermore, the surface of the wire 19 is subjected to processing to produce a dull black finish so as to not reflect light.

Image scanning is executed from the state wherein the first slider 4 is positioned at the home position at one edge of the glass document platen 1. When the motor 16 is actuated to rotate the pulley 18 in the arrow a direction, the wire 19 is driven at a speed V in the arrow b direction. The first slider 4 is driven at an identical speed v in the arrow c direction by the wire 19 because the anchor 22 is pulled directly. The first slider 4 scans the image of a document placed on the glass document platen 1 within a range corresponding to the copy size and magnification, such that the image of the document is sequentially exposed on the surface of photosensitive drum 2 through an optical path comprising first through third mirrors 6, 9, 10, projection lens 11, and fourth mirror 12. When the wire 19 and the first slider 4 are driven at the speed V in the arrow b direction, the second slider 8 provided with second and third mirrors 9 and 10 is pulled at a speed of V/2 in the arrow c direction via the pulley 21 provided in the vicinity of the center of gravity so as to maintain a constant optical path length of the optical system of the scanning unit 3.

Arranged around the periphery of the photosensitive drum 2 are an eraser lamp, a charger, developing device, a transfer charger, a cleaning device and the like. The surface of the photosensitive drum 2 is uniformly charged by the aforesaid charger, and thereafter an electrostatic latent image is formed on said uniformly charged surface via the previously mentioned exposure light. This electrostatic latent image is developed by the aforesaid developing device as a toner image. This toner image is then transferred via the transfer charger onto a transfer medium which has been simultaneously fed. After the toner image has been transferred, residual toner remaining on the surface of photosensitive drum 2 is removed therefrom by the cleaning device, and residual charge remaining on the surface of the drum is removed by the eraser lamp. Variable copy magnification is accomplished by adjusting the conjugate distance by moving, for example, the projection lens 11 or the like, in the direction of the optical path.

Motor 16 begins reverse rotation when image scanning is completed. Wire 19 is driven in the opposite direction to the arrow b direction via the reverse rotation of the motor 16, and said first and second sliders 4 and 8 are moved in the opposite direction to the arrow c direction so as to be returned to their home positions.

As described above, since the vicinity if the center of gravity of the first slider 4 is actively pulled when reading an image, stable scanning is possible which allows yawing of the first slider 4 to be ignored because the moment of the lateral force generated by lateral friction is eliminated even when friction is generated at bilateral ends between wheels 14a and 14b and advance guides 13a and 13b. Stable scanning is also possible relative to the operation of the second slider 8 similar to the operation of said first slider 4 because of the small distance between the axial centers of both pulleys 21 and 27 in a direction perpendicular to the scanning direction.

In order to suppress yawing, said second slider 8 may have the construction described below. In order to minimize as far as possible the moment of the force acting on said pulleys 21 and 27 of the second slider 8, the diameters of both said pulleys 21 and 27 may be reduced so as to reduce the distance between the axial centers of said pulleys in a direction perpendicular to the scanning direction. Alternatively, the shaft portions of both said pulleys 21 and 27 may be arranged so as to line up on a straight line in the scanning direction.

A second embodiment of the present invention is described hereinafter. Although the first embodiment has been described in terms of equal bilateral friction coefficients of the first slider 4 between said wheels 14a and 14b and said advance guides 13a and 13b arranged at bilateral ends of the first slider 4, when these friction coefficients differ, yawing of the first slider 4 can be suppressed by providing the anchor portion of the wire 19 pulling the first slider 4 not at the center of gravity of said first slider 4, but rather at a position whereat the moments of the lateral forces produced by lateral friction balance and negate one another on a straight line. Specific methods for determining the straight line which balances and cancels out the moments of bilateral forces are described below.

Figure 3:
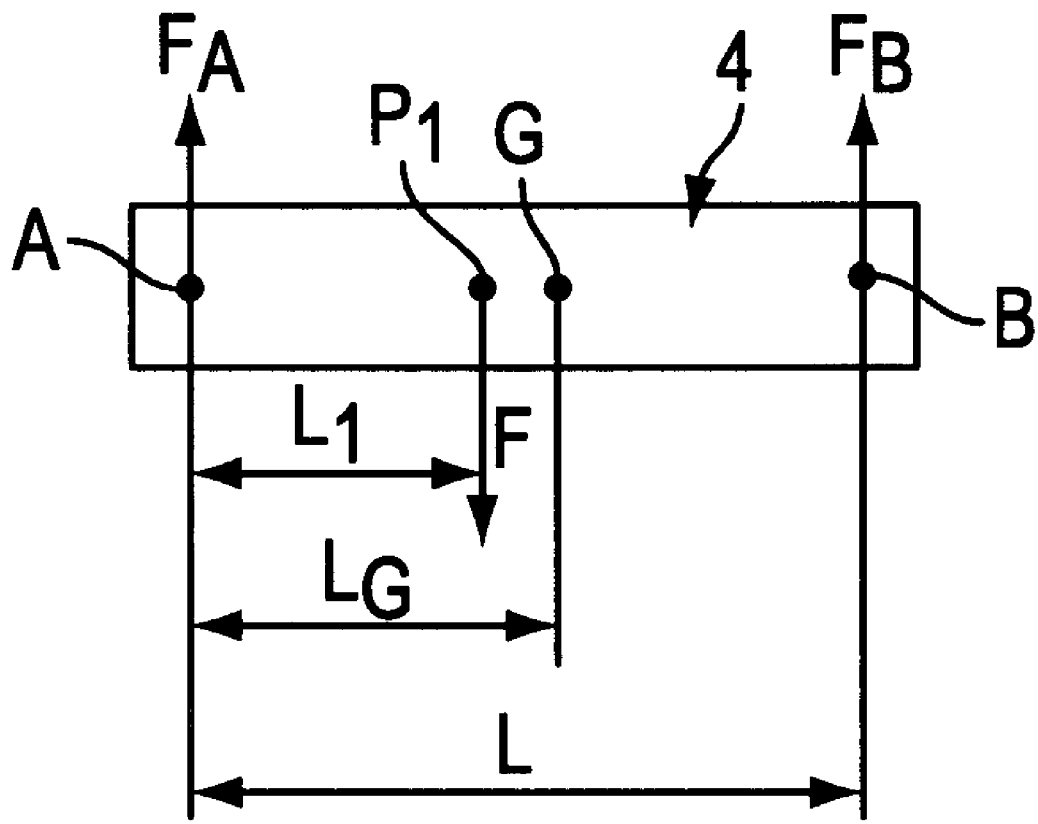
FIG. 3 is a conceptual illustration describing the force acting on the slider within the movement plane.
Figure 4A:
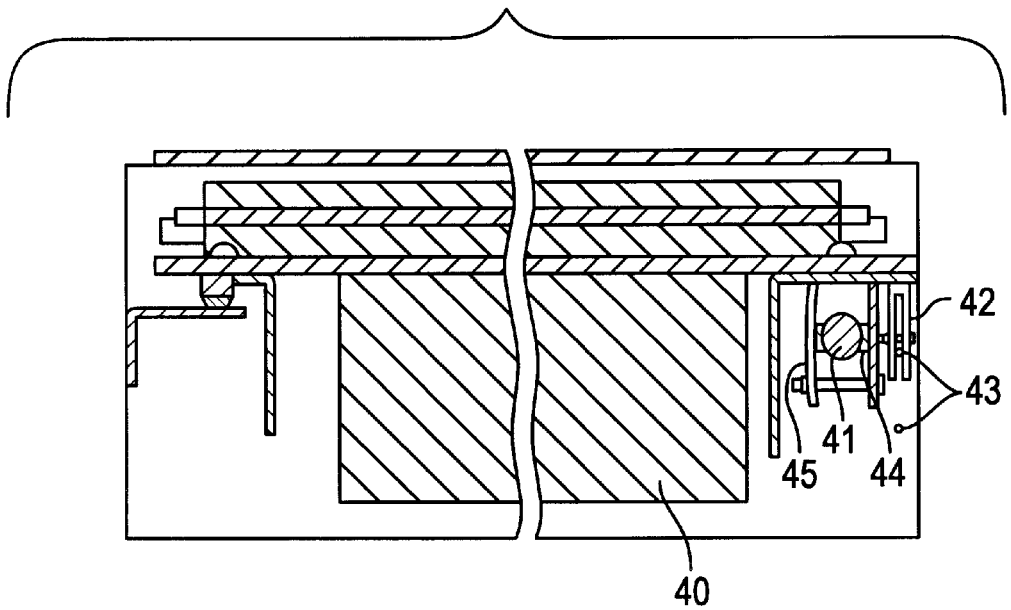
FIG. 4(*a*) is a partial section frontal view of a conventional image reading device, and FIG. 4(*b*) is a right side view of same.
Figure 4B:
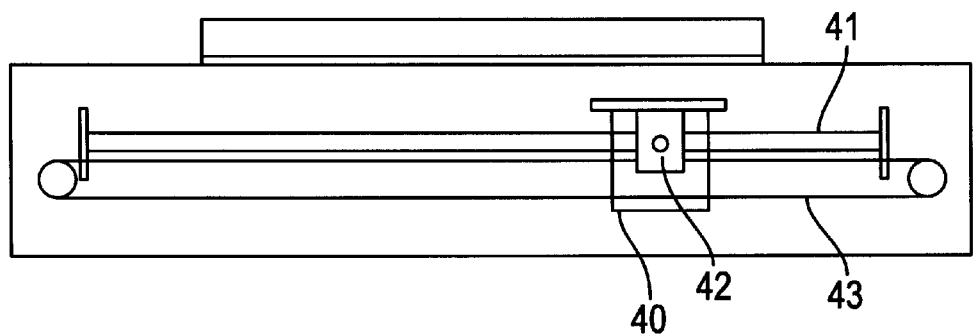
Figure 5:
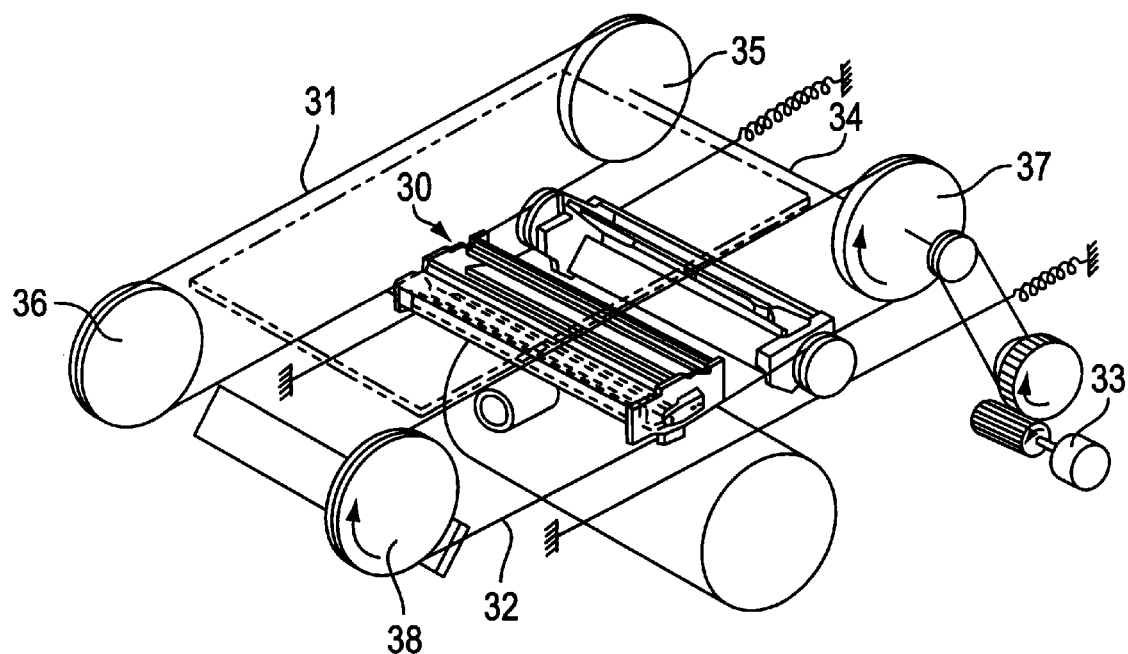
FIG. 5 is a partial section in perspective view of another example of a conventional image reading device.

FIG. 3 is a conceptual drawing of the forces acting within the plane of movement of the first slider 4. In FIG. 3, point A and point B are supports at bilateral ends of the first slider 4, the length between said points A and B is designated L, point G refers to the center of gravity of the first slider 4, the distance between said points A and G is designated LG, the mass of the first slider 4 is designated M, the gravitational acceleration is designated g, and the friction coefficients of point A and point B are respectively designated $\mu A$ and $\mu B$. The frictional forces FA and FB acting on points A and B can be determined by the following equations.

$$FA = ((L-LG)/L) \times \mu A M g \qquad (1)$$

$$FB = (LG/L) \times \mu B M g \qquad (2)$$

When the traction point of the first slider 4 is designated point P1 and the distance between point A and point P1 is designated L1, the magnitude of the moments of lateral forces produced by the bilateral friction forces become (L−L1)FA and L1FB, respectively, such that the sign of each becomes mutually opposite. Thus, the condition for balancing and canceling the moments of the bilateral forces is $$(L-L1)FA = L1FB \qquad (3)$$

and when Equations (1) and (2) are substituted in the above expression, the following equation is derived.

$$\mu A L 1 / L G = \mu B (L - L 1)/(L - L G) \qquad (4)$$

When solving for L1, the following equation is derived.

$$L1 = \mu BLGL/(\mu A(L-LG) + \mu BLG) \qquad (5)$$

Yawing of the first slider 4 can be suppressed by providing the traction point of the first slider 4 through point P1 of length L1 on a straight line parallel to the scanning direction pursuant to Equation 5 because the moments of the bilateral forces balance so as to negate one another. In Equation 5, when the values $\mu A$ and $\mu B$ are equal, L1=LG. That is, when the bilateral friction coefficients are equal, the straight line on which the moments of the bilateral forces induced by bilateral friction balance and cancel one another coincides with the straight line passing through the center of gravity of first slider 4.

In the second embodiment, stable scanning is possible by determining the straight line on which the moments of bilateral force produced by bilateral friction in second slider 8 and setting the axial centers of the pulleys 21 and 27 on said straight line to achieve the same operational effect as the first slider 4.

Although the aforesaid embodiments have been described in terms of copiers which scan documents by moving an optical unit, it is to be noted that yawing can be similarly suppressed in the case of a movable document platen type arrangement by driving the document platen on a straight line passing through the frictional center of gravity of said document platen. The present invention also is applicable to the scanning mechanisms of scanners in image readers other than copying machines.

According to the present invention, the occurrence of yawing can be virtually ignored regardless of whether or not the friction coefficients between bilateral slider ends and the lateral advance guides are the same or not because the sliders are driven by a drive wire anchored on a straight line upon which the moments of lateral forces generated by bilateral friction when driving are balanced so as to cancel one another. The anchor position of the drive wire at which the moments of lateral forces balance so as to cancel one another is not limited to the center of gravity of the slider, inasmuch as said anchor position may be set at an optional point on said straight line, and the sliders can be easily designed to achieve the previously described effectiveness because the anchor position of the drive wire can be set not only in the vicinity of the center portion of the slider but may also be set at locations outside the center portion of the slider.

Although preferred embodiments of the invention have been described in the foregoing detailed description and illustrated in the accompanying drawings, it will be understood that the invention is not limited to the disclosed embodiments, but is capable of numerous rearrangements, modification, and substitutions of parts and elements without departing from the spirit of the invention. Accordingly, the present invention is intended to encompass such rearrangements, modifications, and substitutions of parts and elements as fall within the spirit and scope of the invention.

What is claimed is:

1. An image reading device comprising:

a document platen;

an image sensing member;

a first slider movably supported;

a second slider movably supported with a relationship between said document platen and said image sensing member;

an optical system including plural mirrors disposed between said platen and said image sensing member, wherein one of said mirrors is mounted on said first slider and one is mounted on said second slider; and a drive member fixedly attached to said first and second slider, respectively, wherein anchoring portions of said drive member on said first and second slider are at the center of gravity position of said first and second slider, wherein said drive member intersects an optical path of said optical system, and wherein said drive member has a dull black finish so as to not reflect light.

2. An image reading device comprising:

a main body;

a slider;

guide members fixed to said main body and supporting said slider at both lateral ends of said slider; and a drive member fixedly attached to said sliders wherein the anchoring position of said drive member on said slider is on a straight line parallel to a scanning direction of said image reading device and at a position whereat moments of lateral forces produced by lateral friction generated between said slider and said guide members during driving balance so as to negate one another.

3. The device as claimed in claim 2 further comprising:

a document platen placed over said slider;

an image sensing member; and an optical system including plural mirrors disposed between said platen and said image sensing member, wherein one of said plural mirrors is mounted on said slider.

4. The device as claimed in claim 3, wherein said drive member intersects the optical path of said optical system and the surface of said drive member is subjected to processing to produce a dull black finish so as to not reflect light.

5. An image scanning method for an image reading device providing a slider supported with guide members at both lateral ends of said slider, the method comprising the steps of:

supporting said slider movably in a scanning direction;

attaching a drive wire to said slider, wherein the anchoring position of said drive wire on said slider is on a straight line parallel to the scanning direction of said image reading device and at a position whereat moments of lateral forces produced by lateral friction generated between said slider and said guide members during driving balance so as to negate one another.

* * * * *

UNITED STATES PATENT AND TRADEMARK OFFICE
CERTIFICATE OF CORRECTION

PATENT NO. : 5,970,288
DATED : October 19, 1999
INVENTOR(S) : Nanba, et. al.

It is certified that error appears in the above-identified patent and that said Letters Patent is hereby corrected as shown below:

Claim 2, line 6, change "sliders" to --slider--.

Signed and Sealed this

Twenty-fourth Day of October, 2000

Attest:

Q. TODD DICKINSON

*Attesting Officer*     *Director of Patents and Trademarks*